Nov. 12, 1946.  R. L. HOOD ET AL  2,411,092
PHOTOELECTRIC TURBIDIMETER
Filed March 7, 1945
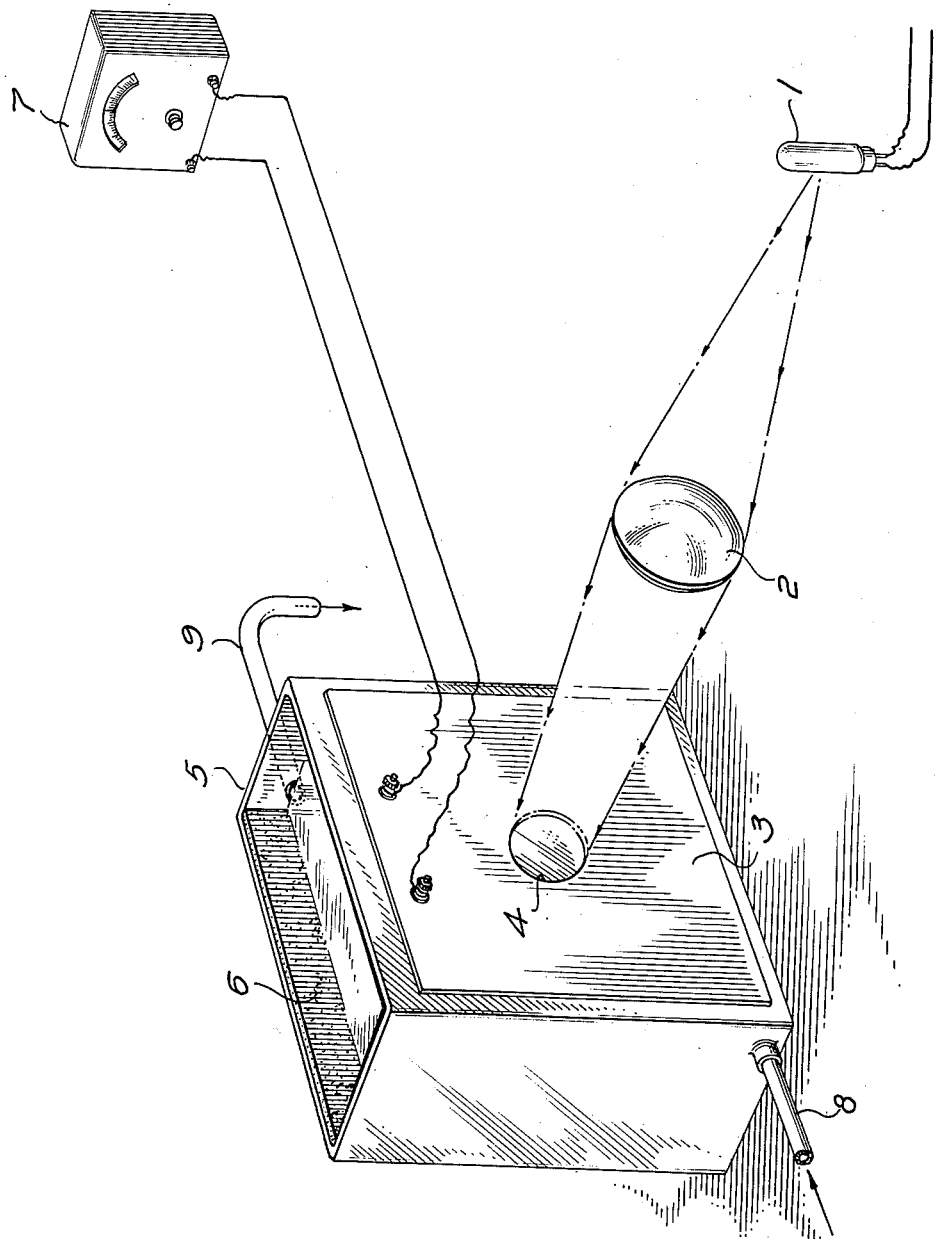
INVENTORS
JOHN W. BERRY,
ROBERT L. HOOD,
BY
ATTORNEY Patented Nov. 12, 1946

2,411,092

UNITED STATES PATENT OFFICE 2,411,092

PHOTOELECTRIC TURBIDIMETER

Robert L. Hood, Stamford, and John W. Berry, Greenwich, Conn., assignors to American Cyanamid Company, New York, N. Y., a corporation of Maine Application March 7, 1945, Serial No. 581,454

2 Claims. (Cl. 250—41.5)

This invention relates to an improved turbidimeter capable of measuring the turbidity of relatively opaque slurries.

Many industrial operations require the continuous or intermittent measurement of turbidity, and a number of turbidimeters or nephelometers have been designed and are in extensive use. In general turbidimeters operate by reason of the scattering of light due to suspended particles. A beam of light is normally passed through a layer of predetermined thickness of the liquid to be measured and the amount of light scattered is measured, usually at right angles to the direction of the beam. In some instruments the scattered light only is measured, for example, by a photocell or phototube of suitable design, and in other instruments the ratio between the light transmitted and the light scattered is measured. The latter may be considered as a differential turbidimeter. Both types have had extensive use, the particular type depending on the nature of the measurement.

Turbidimeters in the past, however, have been useful only with liquids through which light can be transmitted, and are not suitable for measuring opaque slurries, because if the solids content is so high that little or no light is transmitted, neither measurements of transmitted nor scattered light are possible with any accuracy. This has restricted ordinary turbidimeters to the measurement of fluids where the solids content does not exceed a certain maximum. It has been considered in the past that a thick substantially opaque slurry could not be measured, and therefore a considerable field of operations has been excluded from accurate measurement of suspended solids content. In such cases it has been necessary to determine solids content by indirect methods, for instance, by taking a sample and diluting it to a point where its solids content can be measured by existing turbidimeters. The solids content measured is then multiplied by the dilution factor. Such indirect procedures are cumbersome and make the continuous measurement of solids content of thick slurries impractical.

The present invention is directed to a turbidimeter which measures the solids content of thick slurries. Instead of measuring the light scattered at right angles to a beam or the differential between transmitted and scattered light, the instrument measures diffusely reflected light. Essentially the present invention involves the combination of a reflectance cell into or through which the suspension to be measured is introduced or passed, means for directing a beam of light into the cell, and a photosensitive device such as a photocell which receives diffusely reflected light but is shielded from any direct light from the beam. The reflectance of the slurry is a measure of its solids content, if the particle size of the solids remains substantially constant, as it does in practically any slurry which is to be tested continuously for solids content.

While the present invention is primarily concerned with the measurement of very thick slurries which are substantially opaque, it is also useful with slurries which are not as opaque and which are capable of transmitting considerable light. In other words, the turbidimeters of the present invention may be used both for the measurement of slurries so thick that they cannot be measured in any existing turbidimeter, and somewhat more dilute slurries which could be measured in some known types of turbidimeters. It is an advantage of the present invention, therefore, that the instrument is sufficiently versatile so that it may be used with suspensions having a wide range of solids content.

In order to prevent reflectance from the back wall of the cell which might give a disturbing reading in the case of thinner slurries, it is preferable to provide a light absorbing backing for the rear wall of the measuring cell. This may for example be a piece of black resin impregnated sheet material, such as black Bakelite, which is provided with a rough surface so that it is an efficient light absorber. The rear wall of the cell can also be painted with any suitable dull black paint where the slurry to be handled does not attack a paint. Ground black glass may also be used where the nature of the suspension does not permit the use of an organic substance.

The output of the photosensitive device is measured by an indicating or recording galvanometer or other suitable electric device with or without electronic amplification. The design of indicator or recorder forms no part of the present invention, as it is precisely the same as in turbidimeters of conventional design. It is an advantage of the present invention that indicating or recording mechanisms with or without relays to actuate process control devices may be of standard design and therefore instruments embodying the features of the present invention can utilize such arrangements which have been developed for conventional turbidimeters. It is therefore not necessary to design new or different indicating or recording mechanisms or relays. The utilization of standard designs of equipment reduces the cost of turbidimeters of the present invention and makes them more widely applicable.

The invention will be described in greater detail in connection with the drawing, which is a perspective of a compact turbidimeter measuring turbidity directly.

The turbidimeter illustrated is a compact modification which lends itself to the construction of portable instruments. It is provided with a source of light 1 from which a beam is produced by the condenser lens 2. This beam passes through a central hole 4 in a barrier layer photocell 3 and into a glass cell 5, into which the slurry to be measured is introduced. Continuous operation may be effected by causing the slurry to flow into the cell through the inlet pipe 8 and out through the outlet pipe 9. If it is desired to measure a batch, the openings may be closed or a cell used which does not have inlet and outlet means. The back of the cell is provided with a light absorbing backing 6 which is shown by way of example as a sheet of rough surfaced laminated black Bakelite. The photocell 3 receives no direct light from the beam because the back of the cell 5 acts as a mask. The only light striking the photocell is that reflected from the solids in the slurry. In the case of a very thick slurry little if any light penetrates through the fluid. In the case of thinner slurries the light reaching the back of the cell 5 is absorbed by the black backing 6.

The output of the photocell 3 actuates a galvanometer 7 which is shown as provided with a pointer. This is a desirable instrument for portable turbidimeters, but for permanent installations higher accuracy may be obtained by the use of the conventional mirror galvanometer which operates in precisely the same manner.

The amount of reflected light depends on the solids content of the slurry and also, to some degree, on the color and physical nature of the particles which are suspended in the slurry. It is therefore desirable to calibrate the galvanometer for a particular type of suspended solids. Thereafter the reading of the galvanometer will give a measure of solids content. If desired a suitable galvanometer scale indicating the percentage of solids directly may be employed, as is common with the indicating instruments in conventional turbidimeters.

We claim:

1. A turbidimeter comprising a cell having a transparent front wall and a light absorbing back wall adapted to contain a suspension, the turbidity of which is to be measured, means for projecting a beam of light through the front wall of the cell, and a photocell provided with an aperture and mounted on the front wall of the cell with its sensitive side in contact therewith and positioned so that the beam shines through the aperture.

2. A continuous turbidimeter according to claim 1 in which the cell is provided with inlet and outlet means adapted to permit continuous flow therethrough of the suspension, the turbidity of which is to be measured.

ROBERT L. HOOD.
JOHN W. BERRY.